(12) United States Patent
Peuhkurinen

(10) Patent No.: US 11,651,544 B2
(45) Date of Patent: May 16, 2023

(54) SYSTEMS AND METHODS EMPLOYING MULTIPLE GRAPHICS PROCESSING UNITS FOR PRODUCING IMAGES

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 106 days.

(21) Appl. No.: 17/245,752

(22) Filed: Apr. 30, 2021

(65) Prior Publication Data

US 2022/0351461 A1 Nov. 3, 2022

(51) Int. Cl.
| | |
|---|---|
| *G06T 15/20* | (2011.01) |
| *G06T 7/70* | (2017.01) |
| *G06T 1/20* | (2006.01) |
| *G06T 5/00* | (2006.01) |
| *G06T 7/20* | (2017.01) |

(52) U.S. Cl.
CPC ............ *G06T 15/20* (2013.01); *G06T 1/20* (2013.01); *G06T 5/005* (2013.01); *G06T 5/006* (2013.01); *G06T 7/20* (2013.01); *G06T 7/70* (2017.01); *G06T 2207/10024* (2013.01)

(58) Field of Classification Search
None
See application file for complete search history.

(56) References Cited

U.S. PATENT DOCUMENTS

| | | | |
|---|---|---|---|
| 2017/0372457 A1 | 12/2017 | Sylvan et al. | |
| 2018/0268511 A1* | 9/2018 | Sorbo | A63F 13/211 |
| 2018/0330515 A1* | 11/2018 | Stall | G06T 19/003 |
| 2020/0005719 A1 | 1/2020 | Martin et al. | |
| 2020/0327740 A1 | 10/2020 | Frommhold et al. | |
| 2021/0043008 A1* | 2/2021 | Nourai | G06T 15/005 |
| 2021/0185294 A1* | 6/2021 | Malaika | G06F 3/0346 |

OTHER PUBLICATIONS

European Patent Office, Extended European Search Report, Application No. 22167354.4, dated Sep. 28, 2022, 17 pages.

* cited by examiner

Primary Examiner — Patrick F Valdez
(74) Attorney, Agent, or Firm — Ziegler IP Law Group, LLC

(57) ABSTRACT

A system for producing image frames for display at display device. The system includes graphics processing units including first graphics processing unit and second graphics processing unit that are communicably coupled to each other and pose-tracking means. Second graphics processing unit is configured to: process pose-tracking data, to determine device pose and velocity and/or acceleration with which device pose is changing; execute rendering application(s) to generate framebuffer data corresponding to image frame; and send, to first graphics processing unit, framebuffer data and information indicative of device pose and velocity and/or acceleration. First graphics processing unit is configured to: execute first compositing application to post-process framebuffer data, based at least on said information; and drive light source(s) using post-processed framebuffer data to display image frame.

19 Claims, 3 Drawing Sheets

SYSTEMS AND METHODS EMPLOYING MULTIPLE GRAPHICS PROCESSING UNITS FOR PRODUCING IMAGES

TECHNICAL FIELD

The present disclosure relates to systems for producing image frames for display at display devices. Moreover, the present disclosure relates to methods for producing image frames for display at display devices. Furthermore, the present disclosure relates to display systems for producing image frames for display at display devices.

BACKGROUND

In recent times, there has been an ever-increasing demand for image generation and processing. Such a demand is especially critical in case of evolving technologies such as immersive extended-reality (XR) technologies which are being employed in various fields such as entertainment, real estate, training, medical imaging operations, simulators, navigation, and the like. Such immersive XR technologies create immersive XR environments via XR images for presentation to a user of an XR device (such as an XR headset, a pair of XR glasses, or similar).

Presently, a single dedicated Graphics Processing Unit (GPU) is employed to generate visual content to be displayed at a display device. Notably, development and rendering of the visual content, in form of image frames, are computationally heavy operations. For example, high-resolution, small pixel size, and high frame-rate requirements in the XR devices require considerable graphics processing resources, often simultaneously. Therefore, occupancy of the GPU resources is extremely high when performing simultaneous graphics processing tasks, such as image generation tasks, image compositing tasks, image pre-processing tasks, image post-processing tasks, image enhancement tasks, and the like. This puts an immense computational burden on the GPU. Moreover, when the GPU resources are used by two or more graphics processing tasks in a shared manner, interference between such graphics processing tasks occurs when competing for the limited graphics processing resources of the single GPU. This leads to context switching problems (such as increase in context switching time) for the GPU, and thus adversely impacts and reduces both productivity and efficiency of the GPU. For example, the GPU resources may be extremely overburdened in a scenario when the display device is driven to display an image frame at the same time with use of a rolling shutter, as in such a scenario there are generated hundreds of graphics processing tasks per second.

Therefore, in light of the foregoing discussion, there exists a need to overcome the aforementioned drawbacks associated with a single dedicated GPU, when performing multiple simultaneous graphics processing tasks.

SUMMARY

The present disclosure seeks to provide a system for producing image frames for display at a display device. The present disclosure also seeks to provide a method for producing image frames for display at a display device. The present disclosure further seeks to provide a display system. An aim of the present disclosure is to provide a solution that overcomes at least partially the problems encountered in prior art.

In one aspect, an embodiment of the present disclosure provides a system for producing image frames for display at a display device, the system comprising:
a plurality of graphics processing units comprising a first graphics processing unit and a second graphics processing unit that are communicably coupled to each other; and
pose-tracking means communicably coupled to the second graphics processing unit,
wherein the second graphics processing unit is configured to:
  process pose-tracking data obtained from the pose-tracking means, to determine a device pose of the display device and a velocity and/or acceleration with which the device pose is changing;
  execute at least one rendering application to generate framebuffer data corresponding to an image frame, based on the device pose; and
  send, to the first graphics processing unit, the framebuffer data and information indicative of the device pose and the velocity and/or acceleration with which the device pose is changing,
wherein the first graphics processing unit is configured to:
  execute a first compositing application to post-process the framebuffer data, based at least on said information; and
  drive at least one light source of the display device, using the post-processed framebuffer data, to display the image frame.

In another aspect, an embodiment of the present disclosure provides a method for producing image frames for display at a display device, the method being implemented by a plurality of graphics processing units comprising a first graphics processing unit and a second graphics processing unit that are communicably coupled to each other, the method comprising:
  processing, at the second graphics processing unit, pose-tracking data obtained from pose-tracking means to determine a device pose of the display device and a velocity and/or acceleration with which the device pose is changing;
  executing at least one rendering application on the second graphics processing unit to generate framebuffer data corresponding to an image frame, based on the device pose;
  sending, from the second graphics processing unit to the first graphics processing unit, the framebuffer data and information indicative of the device pose and the velocity and/or acceleration with which the device pose is changing;
  executing a first compositing application on the first graphics processing unit to post-process the framebuffer data, based at least on said information; and
  driving at least one light source of the display device, using the post-processed framebuffer data, to display the image frame.

In yet another aspect, an embodiment of the present disclosure provides a display system comprising:
a display device comprising at least one light source;
a plurality of graphics processing units comprising a first graphics processing unit and a second graphics processing unit that are communicably coupled to each other; and
pose-tracking means communicably coupled to the second graphics processing unit,
wherein the second graphics processing unit is configured to:
  process pose-tracking data obtained from the pose-tracking means, to determine a device pose of the display device and a velocity and/or acceleration with which the device pose is changing;

execute at least one rendering application to generate framebuffer data corresponding to an image frame, based on the device pose; and send, to the first graphics processing unit, the framebuffer data and information indicative of the device pose and the velocity and/or acceleration with which the device pose is changing, wherein the first graphics processing unit is configured to:

execute a first compositing application to post-process the framebuffer data, based at least on said information; and drive at least one light source of the display device, using the post-processed framebuffer data, to display the image frame.

Embodiments of the present disclosure substantially eliminate or at least partially address the aforementioned problems in the prior art, and enable production of image frames for display at the display device by employing multiple graphics processing units in a resource-efficient and computation-efficient shared manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
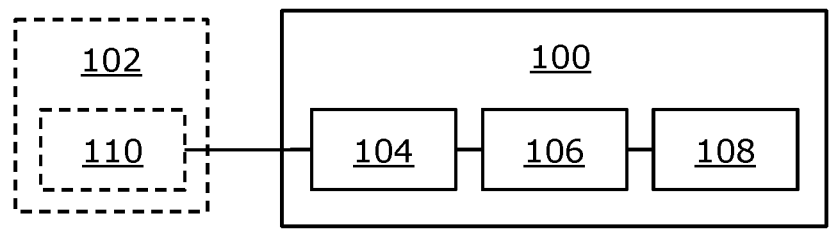
FIG. 1 illustrates a block diagram of architecture of a system for producing image frames for display at a display device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for producing image frames for display at a display device, the system comprising:

a plurality of graphics processing units comprising a first graphics processing unit and a second graphics processing unit that are communicably coupled to each other; and pose-tracking means communicably coupled to the second graphics processing unit, wherein the second graphics processing unit is configured to:

process pose-tracking data obtained from the pose-tracking means, to determine a device pose of the display device and a velocity and/or acceleration with which the device pose is changing;

execute at least one rendering application to generate framebuffer data corresponding to an image frame, based on the device pose; and send, to the first graphics processing unit, the framebuffer data and information indicative of the device pose and the velocity and/or acceleration with which the device pose is changing, wherein the first graphics processing unit is configured to:

execute a first compositing application to post-process the framebuffer data, based at least on said information; and drive at least one light source of the display device, using the post-processed framebuffer data, to display the image frame.

In another aspect, an embodiment of the present disclosure provides a method for producing image frames for display at a display device, the method being implemented by a plurality of graphics processing units comprising a first graphics processing unit and a second graphics processing unit that are communicably coupled to each other, the method comprising:

processing, at the second graphics processing unit, pose-tracking data obtained from pose-tracking means to determine a device pose of the display device and a velocity and/or acceleration with which the device pose is changing;

executing at least one rendering application on the second graphics processing unit to generate framebuffer data corresponding to an image frame, based on the device pose;

sending, from the second graphics processing unit to the first graphics processing unit, the framebuffer data and information indicative of the device pose and the velocity and/or acceleration with which the device pose is changing;

executing a first compositing application on the first graphics processing unit to post-process the framebuffer data, based at least on said information; and driving at least one light source of the display device, using the post-processed framebuffer data, to display the image frame.

In yet another aspect, an embodiment of the present disclosure provides a display system comprising:

a display device comprising at least one light source;

a plurality of graphics processing units comprising a first graphics processing unit and a second graphics processing unit that are communicably coupled to each other; and pose-tracking means communicably coupled to the second graphics processing unit, wherein the second graphics processing unit is configured to:

process pose-tracking data obtained from the pose-tracking means, to determine a device pose of the display device and a velocity and/or acceleration with which the device pose is changing;

execute at least one rendering application to generate framebuffer data corresponding to an image frame, based on the device pose; and send, to the first graphics processing unit, the framebuffer data and information indicative of the device pose and the velocity and/or acceleration with which the device pose is changing, wherein the first graphics processing unit is configured to:

execute a first compositing application to post-process the framebuffer data, based at least on said information; and drive at least one light source of the display device, using the post-processed framebuffer data, to display the image frame.

The present disclosure provides the aforementioned system, the aforementioned method, and the aforementioned display system. Herein, the plurality of graphics processing units are employed instead of a single graphics processing unit, for effectively performing graphics processing tasks pertaining to generation of the image frames in a shared manner. Beneficially, in this way, occupancy of any given graphics processing unit resources is optimized and overburdening of the given graphics processing unit would not occur, even when simultaneous graphics processing tasks, such as image generation tasks, image compositing tasks, image pre-processing tasks, image post-processing tasks, image enhancement tasks, and the like, are required to be performed. Moreover, the system produces the image frame in real time or near-real time (with minimal latency/lag), owing to shared graphics processing. Advantageously, the plurality of graphics processing units also facilitate in minimizing context switching problems (by decreasing context switching time). Therefore, the given graphics processing unit could be judiciously used to also perform other graphics or data processing tasks, if required. This enables maximizing both productivity and efficiency of the given graphics processing unit. The method is fast, effective, reliable and can be implemented with ease.

The system comprises specialized equipment for producing the image frames for display at the display device. It will be appreciated that the system produces the image frames in real time or near-real time. Then, the image frames are communicated from the system to the display device. The image frames are to be presented to a user of the display device.

The term "image frame" refers to visual content, which encompasses not only colour information represented in the image frame, but also other attributes associated with the image frame (for example, such as depth information, transparency information, and the like). It will be appreciated that the image frame represents a real-world scene of a real-world environment. The image frame could also represent a virtual scene of a virtual environment. Optionally, the image frame is captured by employing at least one camera. The at least one camera could be arranged anywhere in the real-world environment where a user is present, or could be arranged on a remote device (for example, a drone, a vehicle, a robot, and the like) present in the real-world environment, or could be arranged on a head-mounted display (HMD) worn by the user on his/her head. Optionally, the at least one camera is implemented as at least one visible light camera. Examples of a given visible light camera include, but are not limited to, a Red-Green-Blue-Depth (RGB), a monochrome camera. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the at least one camera may be implemented as the stereo camera.

Throughout the present disclosure, the term "display device" refers to a specialized equipment that is capable of displaying the image frames. These image frames optionally constitute a visual scene of an extended-reality (XR) environment. Optionally, the display device is implemented as a head-mounted display (HMD). The term "head-mounted display" refers to specialized equipment that is configured to present the XR environment to a user when said HMD, in operation, is worn by the user on his/her head. The HMD is implemented, for example, as an XR headset, a pair of XR glasses, and the like, that is operable to display the visual scene of the XR environment to the user. In such a case, the image frames constitute the visual scene. The term "extended-reality" encompasses virtual reality (VR), augmented reality (AR), mixed reality (MR), and the like.

Notably, the display device comprises the at least one light source. Throughout the present disclosure, the term "light source" refers to an element from which light emanates. The light source is driven to display the image frames produced by the system. Optionally, a given light source is implemented as a display. In this regard, an image frame is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, an image frame is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

Optionally, the given light source is a multi-resolution light source, or a single-resolution light source. The multi-resolution light source is configured to display the image frame at two or more display resolutions, whereas the single-resolution light source is configured to display the image frame at a single display resolution (namely, a uniform display resolution) only. The term "display resolution" of the given light source refers to a total number of pixels in each dimension of the given light source, or to a pixel density (namely, the number of pixels per unit distance or area) of the given light source.

In some implementations, the system is integrated with the display device. In such implementations, the system is physically coupled to the display device (for example, attached via mechanical and/or electrical connections to components of the display device). Optionally, in such implementations, the first graphics processing unit of the system serves as a processor of the display device. Alternatively, optionally, in such implementations, the first graphics processing unit is communicably coupled to a processor of the display device wirelessly and/or in a wired manner.

In other implementations, the system is implemented on a remote device that is separate from the display device. In such implementations, the first graphics processing unit and a processor of the display device are communicably coupled wirelessly and/or in a wired manner. Optionally, the system is mounted on the remote device. Examples of the remote device include, but are not limited to, a drone, a vehicle, and a robot. Optionally, the remote device is physically positioned in a real-world environment, whereas the user of the display device is positioned away from (for example, at a distance from) the remote device. The term "real-world environment" refers to a physical environment in which the user is present.

Throughout the present disclosure, the term "graphics processing unit" refers to a specialized processing device that is capable of performing graphics processing operations. The given graphics processing unit may include at least one Arithmetic Logical Unit (ALU). It will be appreciated that the first and second graphics processing units are communicably coupled to each other wirelessly and/or in a wired manner. As an example, the first and second graphics processing units may be communicably coupled to each other in the wired manner by means of NVLink. It will be appreciated that using the NVlink provides several advantages over using a data bus for communicably coupling the first and second graphics processing units. Such advantages include a high data transmission rate (for example, nearly 600 Gigabytes per second) and minimal latency/lag (for example, few milliseconds) with minimum bandwidth issues.

Throughout the present disclosure, the term "pose-tracking means" refers to specialized equipment that is employed to detect and/or follow a device pose of the display device. The term "pose" encompasses both position and orientation. Optionally, when the display device is worn by the user on his/her head, the pose-tracking means tracks a head pose of the user within the real-world environment, and said pose corresponds to the device pose of the display device. Pursuant to embodiments of the present disclosure, the pose-tracking means is implemented as a true six Degrees of Freedom (6DoF) tracking system. In other words, the pose-tracking means tracks both device position and device orientation of the display device within a three-dimensional (3D) space of the real-world environment. In particular, said pose-tracking means is configured to track translational movements (namely, surge, heave and sway movements) and rotational movements (namely, roll, pitch and yaw movements) of the display device within the 3D space.

The pose-tracking means could be implemented as an internal component of the display device, as a tracking system external to the display device, or as a combination thereof. The pose-tracking means could be implemented as at least one of: an optics-based tracking system (which utilizes, for example, infrared beacons and detectors, infra-red cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the second graphics processing unit employs at least one data processing algorithm to process the pose-tracking data. The pose-tracking means is configured to generate the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the device pose of the display device (such as the HMD). Examples of the at least one data processing algorithm include a feature detection algorithm, an environment mapping algorithm, a data extrapolation algorithm, and the like.

It will be appreciated that when the display device is worn by the user on his/her head, the velocity and/or acceleration with which the device pose is changing corresponds to a velocity and/or acceleration with which the head pose of the user is changing. Optionally, the velocity and/or acceleration with which the device pose is changing is measured as a rate at which the device pose is changing, and the velocity and/or acceleration with which the head pose of the user is changing is measured as a rate at which the head pose of the user is changing. Optionally, in this regard, the second graphics processing unit is configured to process the pose-tracking data to determine the rate at which the head pose of the user is changing, wherein said rate corresponds to the rate at which the device pose of the user is changing. Pose-tracking data of a current time instant is indicative of the device pose and the head pose of the user at the current time instant, whereas pose-tracking data of the current time instant as well as at least one previous time instant is indicative of the velocity and/or acceleration with which the device pose and the head pose of the user is changing. The velocity and the acceleration of the user's head are used to determine how fast the user's current viewpoint and current view direction of viewing the XR environment are changing (at the current time instant). Optionally, the velocity of the user's head is determined in terms of a positional velocity and/or an angular velocity of the user's head. Optionally, the acceleration of the user's head is determined in terms of a linear acceleration and/or an angular acceleration of the user's head.

Throughout the present disclosure, the term "rendering application" refers to a software application that generates the framebuffer data corresponding to the image frame, based on the device pose. The at least one rendering application is a program or process executing on the second graphics processing unit. It will be appreciated that there could be multiple graphics processing units (apart from the second graphics processing unit) to execute the at least one rendering application, if the at least one application is compatible with the multiple graphics processing units. The term "rendering application" also encompasses software that makes the act of generating the framebuffer data corresponding to the image frame possible. Optionally, the at least one rendering application is an XR application that generates framebuffer data corresponding to an XR image frame, based on the device pose. The XR image frame may pertain to an XR game, an XR tutorial, an XR instructional simulator, an XR movie, an XR educational video, and the like. Framebuffer data generation is well-known in the art. It will be appreciated that the at least one rendering application generates device pose-consistent framebuffer data corresponding to the image frame. Typically, a framebuffer is a portion of a memory comprising the framebuffer data (for example, such as a bitmap) that drives the at least one light source. The framebuffer could be a two-dimensional (2D) framebuffer, a frame ring buffer, and the like. Optionally, the at least one rendering application and the framebuffer are connected via an Application Programming Interface (API).

Optionally, the at least one rendering application comprises at least one system application for providing operational functionality of the display system. Optionally, in this regard, at least one system application executes on the second graphics processing unit, wherein the second graphics processing unit is configured to generate, using the at least one system application, system framebuffer data corresponding to a system image frame. In an example, at least one system application may be an application pertaining to a user interface (UI) of the display system, and the system image frame may represent a menu of the UI of the display system.

Optionally, the framebuffer data comprises at least one of: colour data, opacity data, depth data, velocity data. It will be appreciated that the framebuffer data may also comprise other data, for example, such as luminance data, apart from the aforesaid data. The term "colour data" refers to colour information of all pixels in the image frame. Optionally, the colour data is one of: Red-Green-Blue (RGB) colour data, Cyan-Magenta-Yellow-Black (CMYK) colour data. Optionally, the colour data comprises a plurality of colour values of all pixels in the image frame. The term "colour value" of a given pixel refers to a value that is indicative of a colour of the given pixel. The colour value may be expressed as a single colour value or an additive colour value (i.e., a sum of individual colour values of a plurality of colour components of the given pixel). In an example, the colour value may be equal to 180, i.e., a single grayscale value. In another example, the colour value may be equal to '496', i.e., a sum of individual colour values '64', '224' and '208' of red, green, and blue colour components. The term "opacity data" refers to opaqueness information (namely, transparency information) of all pixels in the image frame. Optionally, the opacity data comprises a plurality of alpha values indicative of opacities of colours of all pixels in the image frame. In an example, the plurality of alpha values may be obtained from an alpha channel associated with a Red-Green-Blue-Alpha (RGBA) colour model. Optionally, a given alpha value lies in a range of 0 to 1. Here, 0 indicates lowest opacity (or highest transparency), while 1 indicates highest opacity (or lowest transparency). For example, the given alpha value may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Alternatively, optionally, a given alpha value lies in a range of 0 to 100. Here, 0 indicates lowest opacity, while 100 indicates highest opacity. For example, the given alpha value may be from 0, 10, 20, 30, 40, 50, 60, 70, 80, or 90 up to 10, 20, 30, 40, 50, 60, 70, 80, 90 or 100. Other ranges of alpha values are also feasible. The term "depth data" refers to depth information of all pixels of the image frame. Optionally, the depth data comprises a plurality of depth values of all pixels of the image frame. Optionally, the plurality of depth values are derived from a depth map which is a data structure comprising information pertaining to optical depth of at least one object within a given real-world scene of the real-world environment. Optionally, in this regard, the second graphics processing unit is configured to: control a depth camera to capture at least one depth image of the given real-world scene, and process the at least one depth image for generating the depth map of the given real-world scene. The depth map may also be known as Z-buffer data. Optionally, the at least one depth image is a two-dimensional image or a three-dimensional image. The term "velocity data" refers to velocity information of all pixels of the image frame. Such a velocity information comprises motion vectors encompassing both magnitudes and directions of movements (namely, motion) of object(s) represented by the pixels of the image frame. The magnitude of a given motion vector is a magnitude of an offset (namely, a distance) between an initial position of a given object (in an initial image frame) and a subsequent position of a given object (in a subsequent image frame), while the direction of the given motion vector may be a direction extending from the initial position towards the subsequent position of the given object. Optionally, the given motion vector is determined using a current device pose and at least one previous device pose. Moreover, optionally, the given motion vector is determined using a current device pose and the velocity and/or acceleration with which the device pose is changing.

Notably, the framebuffer data is sent to the first graphics processing unit for further processing based on the information indicative of the device pose and the velocity and/or acceleration with which the device pose is changing. A given compositing application refers to a software application that processes (namely, pre-process and/or post-process) the framebuffer data. The "first compositing application" may also be referred to as "display device compositor". It will be appreciated that the framebuffer data is post-processed to enhance a perceived quality and realism of the image frame so that upon displaying, the image frame provides a device-pose consistent view, and a rich and immersive viewing to experience to the user. The framebuffer data is post-processed according to the information indicative of the device pose and the velocity and/or acceleration with which the device pose is changing. As a result, the post-processed framebuffer data is consistent with an updated device pose that is determined using the information indicative of the device pose and the velocity and/or acceleration with which the device pose is changing. This updated device pose is an estimated device pose of the display device at a time of post-processing the framebuffer data. It will also be appreciated that optionally the first graphics processing unit is further configured to execute the first compositing application to post-process the framebuffer data, based also on other factors for example, such as an arrangement of optics in the display device for optics correction, a camera lag for video-see-through (VST) lag minimization, and the like.

Typically, the at least one light source is driven at a frequency lying in range of 100 Hertz to 1000 Hertz. Such a range of frequency could be higher when multiple light sources are driven using multiple post-processed framebuffer data. Since driving the at least one light source is a high priority and computationally heavy operation, an extremely occupied graphics processing unit often causes overriding and context switching problems. Pursuant to embodiments of the present disclosure, the plurality of graphics processing units are employed to effectively use computational resources of multiple graphics processing units instead of a single graphics processing unit, thereby eliminating graphics processing unit overriding problems that are associated with use of only the single graphics processing unit. This also reduces context switching and overhead problems that are usually caused due to an interference of simultaneous multiple tasks on the single graphics processing unit. It will be appreciated that the first graphics processing unit (i.e., a dedicated graphics processing unit) is employed for driving the at least one light source of the display device, using the post-processed framebuffer data. In such a case, there is an abundance of graphics processing unit resources and the image frame is drawn at a maximum efficiency of the first graphics processing unit (with minimal graphics processing unit overriding and context switching problems). Optionally, the first graphics processing unit is configured to store the image frame (as the post-processed framebuffer data) into a given framebuffer associated with the at least one light source, wherein the given framebuffer drives the at least one light source to display the image frame via the at least one light source.

Optionally, when post-processing the framebuffer data, the first graphics processing unit is configured to perform at least one of: reprojection, distortion correction, colour correction, motion prediction, video-see-through composition, three-dimensional reconstruction, image enhancement, inpainting.

Optionally, the reprojection is performed to modify the framebuffer data corresponding to the image frame based on the updated device pose of the display device. In other words, the image frame is re-projected and/or extrapolated in time, according to the updated device pose, in a manner that the image frame corresponds to the updated device pose. As an example, the image frame may represent an object using a group of pixels lying in a bottom-right region of the image frame. The velocity with which the device pose is changing may be directed leftwards. When the framebuffer data is post-processed based on the information indicative of the device pose and said velocity, the image frame may be reprojected (according to the updated device pose that would lie leftwards of the device pose) in a manner that the object is no longer visible in the image frame. Optionally, the reprojection is performed using projection matrices. Such a reprojection technique is well-known in the art. It will be appreciated that the reprojection (namely, time-warping) minimizes motion-to-photon latency, and increases frame rate (for example, from 40 frames per second (FPS) to 90 FPS) considerably. This improves a viewing experience for the user.

Optionally, the distortion correction is performed to adjust the framebuffer data according to a particular configuration of the at least one light source of the display device and optical element(s) in the display device. In an example, a lens-distortion correction may be performed to adjust visual content corresponding to the framebuffer data to fit into a setup of the at least one light source and the optical element(s) in the display device.

Optionally, the colour correction is performed to adjust the framebuffer data according to required white and black levels, exposure values, contrast values, and white balance. Such a manner of colour correction provides a high colour-fidelity in the subsequently produced image frame and emulates human visual colour perception in the image frame.

Optionally, the motion prediction is performed to shift at least one moving object shown in a visual scene, based on a predicted motion of the at least one moving object. Optionally, when shifting the at least one moving object, pixel values of pixels representing the at least one moving object are shifted based on the predicted motion. As an example, the framebuffer data may be generated in a manner that a moving object that is moving upwards would be represented by a given group of pixels in the image frame. In the post-processed framebuffer data generated using motion prediction, the post-pixel values of the given group of pixels may be shifted upwards by certain units (for example, by 15 pixels).

Optionally, the VST composition is performed to compose (namely, build or generate) the image frame to be displayed at the at least one light source using the framebuffer data (generated by the at least one rendering application) and at least one camera image frame. The VST composition comprises at least compositing tasks pertaining to generation of the image frame.

Optionally, the three-dimensional (3D) reconstruction is performed to create a 3D data model of a given real-world scene using at least two image frames. Optionally, in this regard, the given graphics processing unit is configured to employ at least one image processing technique. The at least one image processing technique is optionally at least one of: an image stitching technique, an image merging technique, an image combining technique, an image layering technique, an image blending technique, or similar. Optionally, the 3D data model is one of: a 3D point cloud model, a 3D triangular mesh model, a 3D quadrilateral mesh model, a voxel-based model, a parametric model, a depth map-based model. The 3D reconstruction could also be performed to create a 3D data model of a given object in the real-world environment using at least two image frames.

Optionally, the image enhancement is performed to improve a quality of the image frame. The image enhancement may be performed using one or more image enhancement operations such as image sharpening, image brightening, image cropping, image zooming, image resizing, image smoothening, and the like. Optionally, the image enhancement is performed to digitally superimpose virtual content on at least a portion of the image frame to produce an XR image frame using the image frame (in particular, the framebuffer data corresponding to an image frame). The term "virtual content" refers to a computer-generated content (namely, a digital content). The virtual content may comprise at least one virtual object. Examples of the at least one virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and a virtual information (such as a virtual news description, a virtual announcement, virtual data, and so forth).

Optionally, the inpainting is performed to reconstruct (namely, restore or fill in) missing and/or obliterated visual information in the framebuffer data corresponding to the image frame. The visual information could be missing and/or obliterated as it may not be captured by the at least one camera, or may be captured with blurred visual details, and the like. It will be appreciated that by performing the inpainting, the missing and/or obliterated visual information would be accurately reconstructed to represent visual information in an entirety of the framebuffer data corresponding to the image frame. In this way, the image frame so produced would be immersive, realistic, and rich in terms of image data (as the image data would now be available for an entirety of the image frame). Inpainting operation is well-known in the art. Optionally, when performing the inpainting, the given graphics processing unit is configured to employ at least one inpainting algorithm. Optionally, the at least one inpainting algorithm is at least one of: a Rapid Frequency Selective Reconstruction (FSR) algorithm, a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm.

In an embodiment, the first graphics processing unit is configured to execute the first compositing application to pre-process the framebuffer data from a raw form to a composited form, prior to post-processing the framebuffer data. The raw form of the framebuffer data refers to an unstructured form of the framebuffer data that could have a large size, whereas the composited form of the framebuffer data refers to a structured form of the framebuffer data that could have relatively smaller size than the raw form of the framebuffer data. It will be appreciated that when the framebuffer data is pre-processed from the raw form to the composited form, further processing (i.e., post-processing) of the framebuffer data would require minimal computational resources and time of the first graphics processing unit. This considerably increases efficiency of the first graphics processing unit.

In another embodiment, the second graphics processing unit is configured to execute a second compositing application to pre-process the framebuffer data from a raw form to a composited form, prior to sending the framebuffer data to the first graphics processing unit. The "second compositing application" may also be referred to as "application compositor". It will be appreciated that the composited from of the framebuffer data is sent to the first graphics processing unit with minimal latency and/or attenuation, as compared to when the raw form of the framebuffer data is sent to the first graphics processing unit. This is because the composited form of the framebuffer data is relatively more structured and smaller in size than the raw form of the framebuffer data. This is especially beneficial when multiple rendering applications are executed by the second graphics processing unit, and an amount of the framebuffer data that is to be sent from the second graphics processing unit to the first graphics processing unit is quite high.

Optionally, the second graphics processing unit is configured to execute the second compositing application to post-process the framebuffer data, based at least on the device pose and the velocity and/or acceleration with which the device pose is changing, prior to sending the framebuffer data to the first graphics processing unit. In some implementations, post-processing of the framebuffer data is done entirely by the first graphics processing unit. In other implementations, post-processing of the framebuffer data is done entirely by the second graphics processing unit. In yet other implementations, post-processing of the framebuffer data is done by both the first and second graphics processing units in a shared manner. In such a case, a particular post-processing operation that cannot be performed by the first graphics processing unit, would be performed by the second graphics processing unit. It will be appreciated that optionally the second graphics processing unit is further configured to execute the second compositing application to post-process the framebuffer data, based on other factors like the arrangement of optics in the display device for optics correction, the camera lag for video-see-through (VST) lag minimization, and the like.

Optionally, when post-processing the framebuffer data, the second graphics processing unit is configured to perform at least one of: reprojection, distortion correction, colour correction, motion prediction, video-see-through composition, three-dimensional reconstruction, image enhancement, inpainting. Herein, processing resources of the second graphics processing unit are used for performing at least one of the aforesaid operations. These operations have been described above in detail, and as discussed earlier in the description, some of these operations may be performed by the first graphics processing unit and other operations may be performed by the second graphics processing unit. In an example, when post-processing the framebuffer data, the first graphics processing unit may be configured to perform the reprojection, the distortion correction, the motion prediction, and the VST composition, while the second graphics processing unit may be configured to perform the image enhancement and the inpainting.

The present disclosure also relates to the method as described above. Various embodiments and variants disclosed above, with respect to the aforementioned first aspect, apply mutatis mutandis to the method.

Optionally, the method further comprises executing a second compositing application on the second graphics processing unit to pre-process the framebuffer data from a raw form to a composited form, prior to sending the framebuffer data to the first graphics processing unit.

Optionally, the method further comprises executing a second compositing application on the second graphics processing unit to post-process the framebuffer data, based at least on the device pose and the velocity and/or acceleration with which the device pose is changing, prior to sending the framebuffer data to the first graphics processing unit.

Optionally, in the method, the step of post-processing the framebuffer data comprises performing at least one of: reprojection, distortion correction, colour correction, motion prediction, video-see-through composition, three-dimensional reconstruction, image enhancement, inpainting.

Optionally, the method further comprises executing the first compositing application on the first graphics processing unit to pre-process the framebuffer data from a raw form to a composited form, prior to post-processing the framebuffer data.

Optionally, in the method, the framebuffer data comprises at least one of: colour data, opacity data, depth data, velocity data.

Optionally, in the method, the step of post-processing the framebuffer data comprises performing at least one of: reprojection, distortion correction, colour correction, motion prediction, video-see-through composition, three-dimensional reconstruction, image enhancement, inpainting.

The present disclosure also relates to the display device as described above. Various embodiments and variants disclosed above, with respect to the aforementioned first aspect and the aforementioned second aspect, apply mutatis mutandis to the display device.

Optionally, in the display system, the second graphics processing unit is configured to execute a second compositing application to pre-process the framebuffer data from a raw form to a composited form, prior to sending the framebuffer data to the first graphics processing unit.

Optionally, in the display system, the second graphics processing unit is configured to execute a second compositing application to post-process the framebuffer data, based at least on the device pose and the velocity and/or acceleration with which the device pose is changing, prior to sending the framebuffer data to the first graphics processing unit.

Optionally, in the display system, when post-processing the framebuffer data, the second graphics processing unit is configured to perform at least one of: reprojection, distortion correction, colour correction, motion prediction, video-see-through composition, three-dimensional reconstruction, image enhancement, inpainting.

Optionally, in the display system, the first graphics processing unit is configured to execute the first compositing application to pre-process the framebuffer data from a raw form to a composited form, prior to post-processing the framebuffer data.

Optionally, in the display system, the display device comprises the first graphics processing unit, while the second graphics processing unit is external to the display device, the first graphics processing unit and the second graphics processing unit being communicably coupled to each other in a wired manner. Optionally, in this regard, the first graphics processing unit has lesser graphics processing resources than the second graphics processing unit. Optionally, the second graphics processing unit is implemented in a computer that is communicably coupled to the display device. It will be appreciated that when the first graphics processing unit and the second graphics processing unit are communicably coupled to each other in the wired manner, a high amount of data could be easily transferred between the first and second graphics processing units (without any latency/lag).

Optionally, in the display system, the framebuffer data comprises at least one of: colour data, opacity data, depth data, velocity data.

Optionally, in the display system, when post-processing the framebuffer data, the first graphics processing unit is configured to perform at least one of: reprojection, distortion correction, colour correction, motion prediction, video-see-through composition, three-dimensional reconstruction, image enhancement, inpainting.

DETAILED DESCRIPTION OF THE DRAWINGS

Referring to FIG. 1, illustrated is a block diagram of architecture of a system 100 for producing image frames for display at a display device 102, in accordance with an embodiment of the present disclosure. The system 100 comprises a plurality of graphics processing units comprising a first graphics processing unit 104 and a second graphics processing unit 106 that are communicably coupled to each other, and pose-tracking means 108 communicably coupled to the second graphics processing unit 106. The display device 102 comprises at least one light source (depicted as a light source 110). The first graphics processing unit 104 is communicably coupled to the light source 110.

Figure 2:
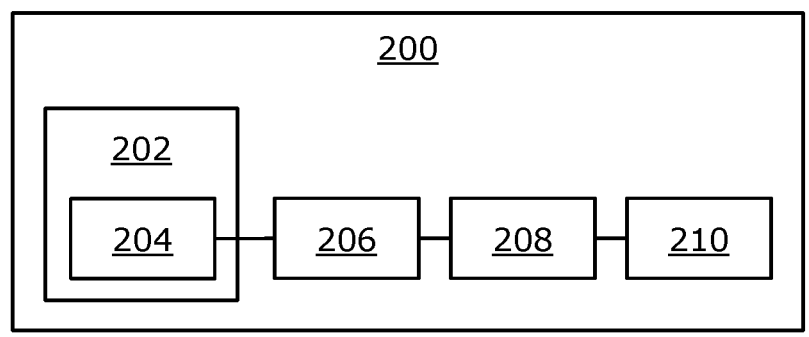
FIG. 2 illustrates a block diagram of architecture of a display system, in accordance with an embodiment of the present disclosure.

Referring to FIG. 2, illustrated is a block diagram of architecture of a display system 200, in accordance with an embodiment of the present disclosure. The display system 200 comprises a display device 202 comprising at least one light source (depicted as a light source 204), a plurality of graphics processing units comprising a first graphics processing unit 206 and a second graphics processing unit 208 that are communicably coupled to each other, and pose-tracking means 210 communicably coupled to the second graphics processing unit 208. The first graphics processing unit 206 is communicably coupled to the light source 204.

Figure 3A:
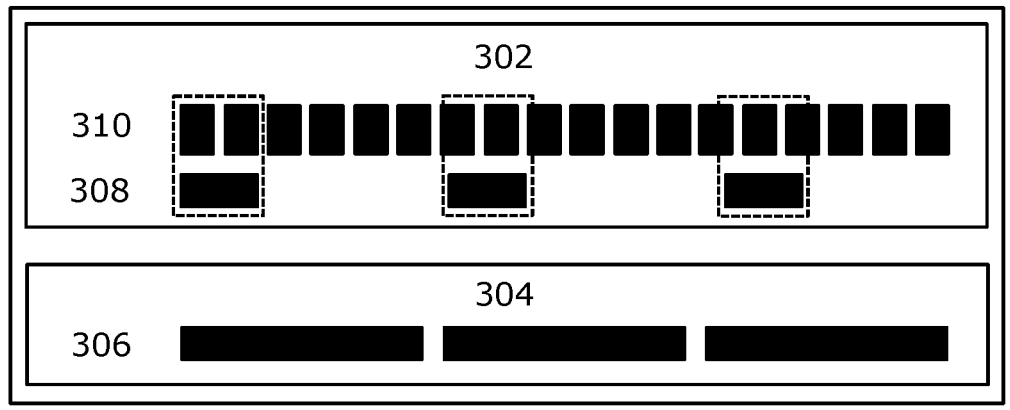
FIGS. 3A and 3B illustrate two exemplary scenarios of implementing a first graphics processing unit and a second graphics processing unit, in accordance with different embodiments of the present disclosure.

Referring to FIG. 3A, illustrated is a first exemplary scenario of implementing a first graphics processing unit 302 and a second graphics processing unit 304, in accordance with an embodiment of the present disclosure. Herein, the second graphics processing unit 304 is configured to execute at least one rendering application to generate framebuffer data corresponding to an image frame, whereas the first graphics processing unit 302 is configured to pre-process the framebuffer data, post-process the framebuffer data, and drive at least one light source (not shown) of a display device (not shown), to display the image frame. Resource utilization in time of the second graphics processing unit 304 is depicted by 3 long rectangular bars 306 (corresponding to execution of the at least one rendering application to generate the framebuffer data). Moreover, resource utilization in time of the first graphics processing unit 302 is depicted by 3 short rectangular bars 308 (corresponding to the pre-processing) and by 18 mini rectangular bars 310 (corresponding to the post-processing and driving the at least one light source). Herein, dashed rectangular boxes depict simultaneous resource utilization of the first graphics processing unit 302 for performing multiple graphics processing tasks. Time instants corresponding to the dashed rectangular boxes are associated with high graphics processing load. This high graphics processing load is effectively shared between both the first graphics processing unit 302 and the second graphics processing unit 304, in this exemplary scenario.

Figure 3B:
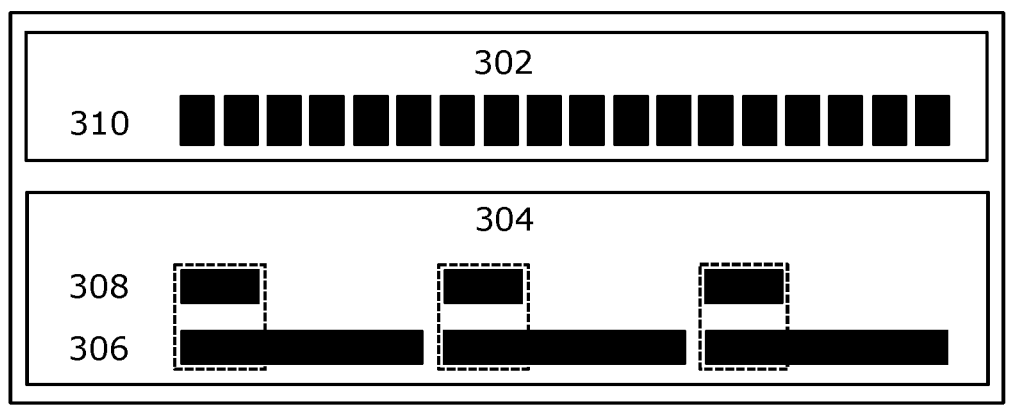

Referring to FIG. 3B, illustrated is a second exemplary scenario of implementing a first graphics processing unit 302 and a second graphics processing unit 304, in accordance with another embodiment of the present disclosure. Herein, the second graphics processing unit 304 is configured to execute at least one rendering application to generate framebuffer data corresponding to an image frame, and pre-process the framebuffer data, whereas the first graphics processing unit 302 is configured to post-process the framebuffer data, and drive at least one light source (not shown) of a display device (not shown), to display the image frame. Resource utilization in time of the second graphics processing unit 304 is depicted by 3 long rectangular bars 306 (corresponding to execution of the at least one rendering application to generate the framebuffer data) and 3 short rectangular bars 308 (corresponding to the pre-processing). Moreover, resource utilization in time of the first graphics processing unit 302 is depicted by 18 mini rectangular bars 310 (corresponding to the post-processing and driving the at least one light source). Herein, dashed rectangular boxes depict simultaneous resource utilization of the second graphics processing unit 304 for performing multiple graphics processing tasks. Time instants corresponding to the dashed rectangular boxes are associated with high graphics processing load. This high graphics processing load is effectively shared between both the first graphics processing unit 302 and the second graphics processing unit 304, in this exemplary scenario.

Figure 4:
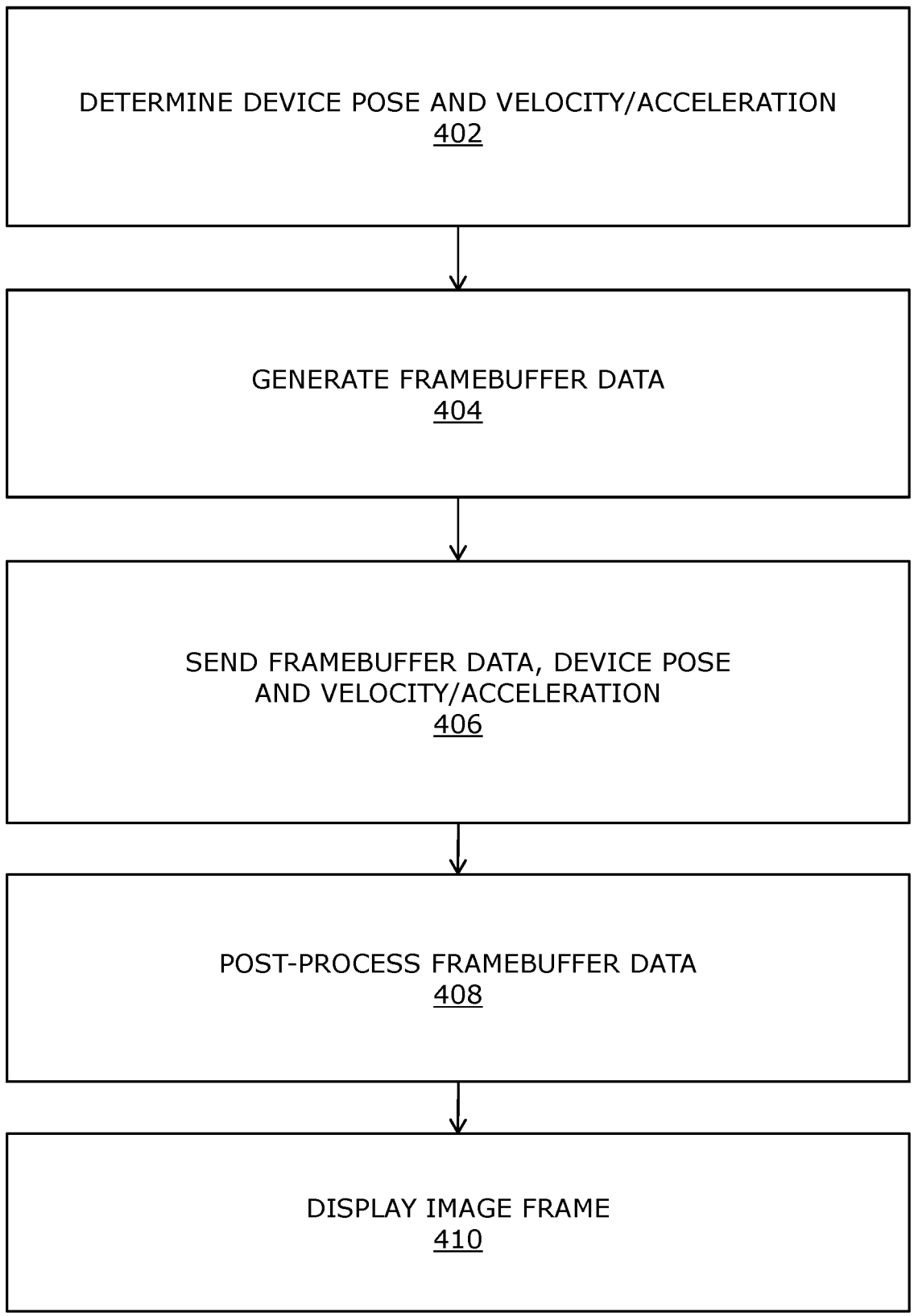
FIG. 4 illustrates steps of a method for producing image frames for display at a display device, in accordance with an embodiment of the present disclosure.

Referring to FIG. 4, illustrated are steps of a method for producing image frames for display at a display device, in accordance with an embodiment of the present disclosure. The method is implemented by a plurality of graphics processing units comprising a first graphics processing unit and a second graphics processing unit that are communicably coupled to each other. At step 402, pose-tracking data obtained from pose-tracking means is processed, at the second graphics processing unit, to determine a device pose of the display device and a velocity and/or acceleration with which the device pose is changing. At step 404, at least one rendering application is executed on the second graphics processing unit to generate framebuffer data corresponding to an image frame, based on the device pose. At step 406, the framebuffer data and information indicative of the device pose and the velocity and/or acceleration with which the device pose is changing are sent from the second graphics processing unit to the first graphics processing unit. At step 408, a first compositing application is executed on the first graphics processing unit to post-process the framebuffer data, based at least on said information. At step 410, at least one light source of the display device is driven, using the post-processed framebuffer data, to display the image frame.

The steps 402, 404, 406, 408 and 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for producing image frames for display at a display device, the system comprising:
    a plurality of graphics processing units comprising a first graphics processing unit and a second graphics processing unit that are communicably coupled to each other; and
    pose-tracking means communicably coupled to the second graphics processing unit,
    wherein the second graphics processing unit is configured to:
        process pose-tracking data obtained from the pose-tracking means, to determine a device pose of the display device and a velocity and/or acceleration with which the device pose is changing;
        execute at least one rendering application to generate framebuffer data corresponding to an image frame, based on the device pose; and
        send, to the first graphics processing unit, the framebuffer data and information indicative of the device pose and the velocity and/or acceleration with which the device pose is changing, wherein the first graphics processing unit is configured to:
        execute a first compositing application to post-process the framebuffer data, based at least on said information; and
        drive at least one light source of the display device, using the post-processed framebuffer data, to display the image frame,
        wherein the second graphics processing unit is configured to execute a second compositing application to post-process the framebuffer data, based at least on the device pose and the velocity and/or acceleration with which the device pose is changing, prior to sending the framebuffer data to the first graphics processing unit.

2. The system of claim 1, wherein the second graphics processing unit is configured to execute a second compositing application to pre-process the framebuffer data from a raw form to a composited form, prior to sending the framebuffer data to the first graphics processing unit.

3. The system of claim 1, wherein, when post-processing the framebuffer data, the second graphics processing unit is configured to perform at least one of: reprojection, distortion correction, colour correction, motion prediction, video-see-through composition, three-dimensional reconstruction, image enhancement, inpainting.

4. The system of claim 1, wherein the first graphics processing unit is configured to execute the first compositing application to pre-process the framebuffer data from a raw form to a composited form, prior to post-processing the framebuffer data.

5. The system of claim 1, wherein the framebuffer data comprises at least one of: colour data, opacity data, depth data, velocity data.

6. The system of claim 1, wherein, when post-processing the framebuffer data, the first graphics processing unit is configured to perform at least one of: reprojection, distortion correction, colour correction, motion prediction, video-see-through composition, three-dimensional reconstruction, image enhancement, inpainting.

7. A method for producing image frames for display at a display device, the method being implemented by a plurality of graphics processing units comprising a first graphics processing unit and a second graphics processing unit that are communicably coupled to each other, the method comprising:
    processing, at the second graphics processing unit, pose-tracking data obtained from pose-tracking means to determine a device pose of the display device and a velocity and/or acceleration with which the device pose is changing;
    executing at least one rendering application on the second graphics processing unit to generate framebuffer data corresponding to an image frame, based on the device pose;
    sending, from the second graphics processing unit to the first graphics processing unit, the framebuffer data and information indicative of the device pose and the velocity and/or acceleration with which the device pose is changing;
    executing a first compositing application on the first graphics processing unit to post-process the framebuffer data, based at least on said information; and
    driving at least one light source of the display device, using the post-processed framebuffer data, to display the image frame,
    the method further comprising executing a second compositing application on the second graphics processing unit to post-process the framebuffer data, based at least on the device pose and the velocity and/or acceleration with which the device pose is changing, prior to sending the framebuffer data to the first graphics processing unit.

8. The method of claim 7, further comprising executing a second compositing application on the second graphics processing unit to pre-process the framebuffer data from a raw form to a composited form, prior to sending the framebuffer data to the first graphics processing unit.

9. The method of claim 7, wherein the step of post-processing the framebuffer data comprises performing at least one of: reprojection, distortion correction, colour correction, motion prediction, video-see-through composition, three-dimensional reconstruction, image enhancement, inpainting.

10. The method of claim 7, further comprising executing the first compositing application on the first graphics processing unit to pre-process the framebuffer data from a raw form to a composited form, prior to post-processing the framebuffer data.

11. The method of claim 7, wherein the framebuffer data comprises at least one of: colour data, opacity data, depth data, velocity data.

12. The method of claim 7, wherein the step of post-processing the framebuffer data comprises performing at least one of: reprojection, distortion correction, colour correction, motion prediction, video-see-through composition, three-dimensional reconstruction, image enhancement, inpainting.

13. A display system comprising:
a display device comprising at least one light source;
a plurality of graphics processing units comprising a first graphics processing unit and a second graphics processing unit that are communicably coupled to each other; and
pose-tracking means communicably coupled to the second graphics processing unit,
wherein the second graphics processing unit is configured to:
process pose-tracking data obtained from the pose-tracking means, to determine a device pose of the display device and a velocity and/or acceleration with which the device pose is changing;
execute at least one rendering application to generate framebuffer data corresponding to an image frame, based on the device pose; and
send, to the first graphics processing unit, the framebuffer data and information indicative of the device pose and the velocity and/or acceleration with which the device pose is changing, wherein the first graphics processing unit is configured to:
execute a first compositing application to post-process the framebuffer data, based at least on said information; and
drive at least one light source of the display device, using the post-processed framebuffer data, to display the image frame,
wherein the second graphics processing unit is configured to execute a second compositing application to post-process the framebuffer data, based at least on the device pose and the velocity and/or acceleration with which the device pose is changing, prior to sending the framebuffer data to the first graphics processing unit.

14. The display system of claim 13, wherein the second graphics processing unit is configured to execute a second compositing application to pre-process the framebuffer data from a raw form to a composited form, prior to sending the framebuffer data to the first graphics processing unit.

15. The display system of claim 13, wherein, when post-processing the framebuffer data, the second graphics processing unit is configured to perform at least one of: reprojection, distortion correction, colour correction, motion prediction, video-see-through composition, three-dimensional reconstruction, image enhancement, inpainting.

16. The display system of claim 13, wherein the first graphics processing unit is configured to execute the first compositing application to pre-process the framebuffer data from a raw form to a composited form, prior to post-processing the framebuffer data.

17. The display system of claim 13, wherein the display device comprises the first graphics processing unit, while the second graphics processing unit is external to the display device, the first graphics processing unit and the second graphics processing unit being communicably coupled to each other in a wired manner.

18. The display system of claim 13, wherein the framebuffer data comprises at least one of: colour data, opacity data, depth data, velocity data.

19. The display system of claim 13, wherein, when post-processing the framebuffer data, the first graphics processing unit is configured to perform at least one of: reprojection, distortion correction, colour correction, motion prediction, video-see-through composition, three-dimensional reconstruction, image enhancement, inpainting.

* * * * *